United States Patent [19]

Hazenbroek

[11] Patent Number: 4,939,813
[45] Date of Patent: Jul. 10, 1990

[54] APPARATUS FOR REMOVING THE LEGS FROM BACK PORTION OF POULTRY

[76] Inventor: Jacobus E. Hazenbroek, Burg de Zeeuwastraat 52, Numansdorp, Netherlands

[21] Appl. No.: 433,148

[22] Filed: Nov. 8, 1989

Related U.S. Application Data

[63] Continuation-in-part of Ser. No. 304,542, Jan. 31, 1989, Pat. No. 4,896,399.

[51] Int. Cl.⁵ .............................................. A22C 21/00
[52] U.S. Cl. ............................................. 17/11; 17/52
[58] Field of Search .......................... 17/11, 52, 46, 45

[56] References Cited

U.S. PATENT DOCUMENTS

| | | | |
|---|---|---|---|
| 4,385,421 | 5/1983 | Martin | 17/52 |
| 4,402,112 | 9/1983 | Gasbarro | 17/11 |
| 4,558,490 | 12/1985 | Hazenbroek et al. | 17/52 |
| 4,644,608 | 2/1987 | Martin et al. | 17/11 |
| 4,896,399 | 1/1990 | Hazenbroek | 17/11 |

Primary Examiner—Willis Little
Attorney, Agent, or Firm—Thomas & Kennedy

[57] ABSTRACT

An apparatus for removing the legs from the back portion of poultry includes a processing station (13) for use with an overhead conveyor from which the birds are suspended by their legs. The processing station (13) has a V-shaped guide plate (12) for receiving the back portion of a bird and means for advancing and gripping the bird. The advancing and gripping means comprises a chain (16) with outwardly projecting pins (17) extending about chain wheels (14, 15). The gripping and advancing means accelerate the back portion of the bird relative to the legs, and after cutting and scoring by cutters (19, 25, 31), the back portion is torn from the legs to leave the "oysters" attached to the legs.

28 Claims, 6 Drawing Sheets

4,939,813

APPARATUS FOR REMOVING THE LEGS FROM BACK PORTION OF POULTRY

CROSS REFERENCE TO RELATED APPLICATION

This is a continuation-in-part of U.S. patent application Ser. No. 304,542, filed Jan. 31, 1989 now U.S. Pat. No. 4,896,399.

FIELD OF THE INVENTION

This invention relates to the processing of raw poultry by which the poultry product is prepared for human consumption. More particularly, this invention relates to a method and apparatus for separating poultry parts, such as separating the back from the thighs of the birds in a continuous fully automated process.

BACKGROUND OF THE INVENTION

When previously eviscerated poultry carcasses are to be cut into parts, it is desirable that the parts be accurately separated from one another so that bone chips or fragments are not formed during the separating process and are not found in the separated parts. Further, it is desirable that the separating functions be performed in a rapidly operating automated system which accurately separates the parts from one another.

In recent years, more extensive use has been made of the overhead conveyor system in poultry processing plants, whereby the birds are suspended from an overhead conveyor system in an inverted attitude, with the legs of the bird supported in shackles that are carried by the conveyor system. The shackles move the birds through one or more processing stages, such as a vent cutter, a bird opener, an eviscerator, a neck breaker, a lung puller, and a crop remover. Further, the birds can be moved through various parts separating devices so that the carcasses are subdivided into, for example, separated breasts, backs, wings, legs and thighs.

It has been known in the art to cut the legs from the back portion with rotary blades as the poultry is moved along the overhead conveyor. As a consequence of this manner of cutting, part of the peritoneum and some fat may be left on the legs, whereas the so-called oysters are often partially or entirely left on the back portion. For quality's sake, the opposite result should be achieved.

SUMMARY OF THE INVENTION

Briefly described, the present invention comprises an apparatus for removing backs from the saddle of previously cut poultry carcasses as the poultry carcasses are moved along a processing path suspended invertedly by their legs from an overhead conveyor. The apparatus comprises a gripper member for gripping the back portion of a poultry carcass suspended by its legs and which is adapted to proceed along a closed conveyor loop at a higher speed than that of the overhead conveyor, and a guide means is provided which guides the back portion of the carcass in a portion of the closed loop until after the back has been removed from the thighs. With these provisions the back portion is accelerated with respect to the legs, unfolding the joints between the back and its thighs so that a correct incision can be made into the joints between the back and its thighs. Tearing the legs and thighs loose from the back of the carcass saddle is effected as the back of the carcass is moved between a large chain wheel incorporated in the closed conveyor loop and the guide means. The legs and thighs remain supported by the moving shackles of the overhead conveyor and proceed along the processing path of the overhead conveyor as the back is gripped by the gripper member and begins a downward arcuate movement away from the legs.

In a preferred embodiment the gripper member which engages and controls the movement of the back of the carcass comprises a conveyor chain with outwardly projecting pins which clutch and positively move the back of the bird at a faster rate of movement than the legs and thighs along a path that first is substantially parallel to the path of the legs and later diverges from the path of the legs.

The processing station preferably comprises means to center the poultry and to guide it along the blades. The centering means comprises a fork that is cantilevered on a blade-carrying plate and an enlarging, suspended centering valve at its upstream end for centering poultry of different sizes as the poultry enters the processing station.

The guide means can comprise guide rails for aligning poultry with the processing station and a generally V-shaped guide plate for straddling the center of the back portion of the carcass.

The blade-carrying plate can simultaneously serve as support for two pairs of fixed upper blades that operate between the back portion and the legs of the poultry carcass, and one pair of pivotably disposed lower blades that determine the external tear lines between the back portion and the legs of the carcass, the distance between the two upper blades on either side of the blade-carrying plate being bridged by a portion of the guide plate.

The first pair of fixed blades preferably comprises thin blades that cut up to the thigh bone, so that the joint can be unfolded. This unfolding is effected as the pointed chain conveys the back portion faster than the shackle conveyor moves the legs so that the joints are tensioned and the ball joint of the thigh tends to leave its socket. After the cutting action of the thin first pair of blades, the edges of the guide rails enter this initial cut, and the guide rail edges "seek" out the gap of the joints so that the second pair of blades can cut precisely between the bones of the joints. These two blades are sturdier than the first blades, so that they can cut the muscles that retain the joint and those around the joint, so that the thigh is detached from the back portion.

The pivotably disposed lower blades are preferably loaded or biased toward their respective cutting positions, e.g., by means of weights, to allow the blades to cut through muscle and tissue but to pivot as they contact the bone to avoid cutting the bone.

The invention will be described in more detail hereafter by reference to the drawings, in which a preferred embodiment of the invention is disclosed.

DETAILED DESCRIPTION

Figure 1:
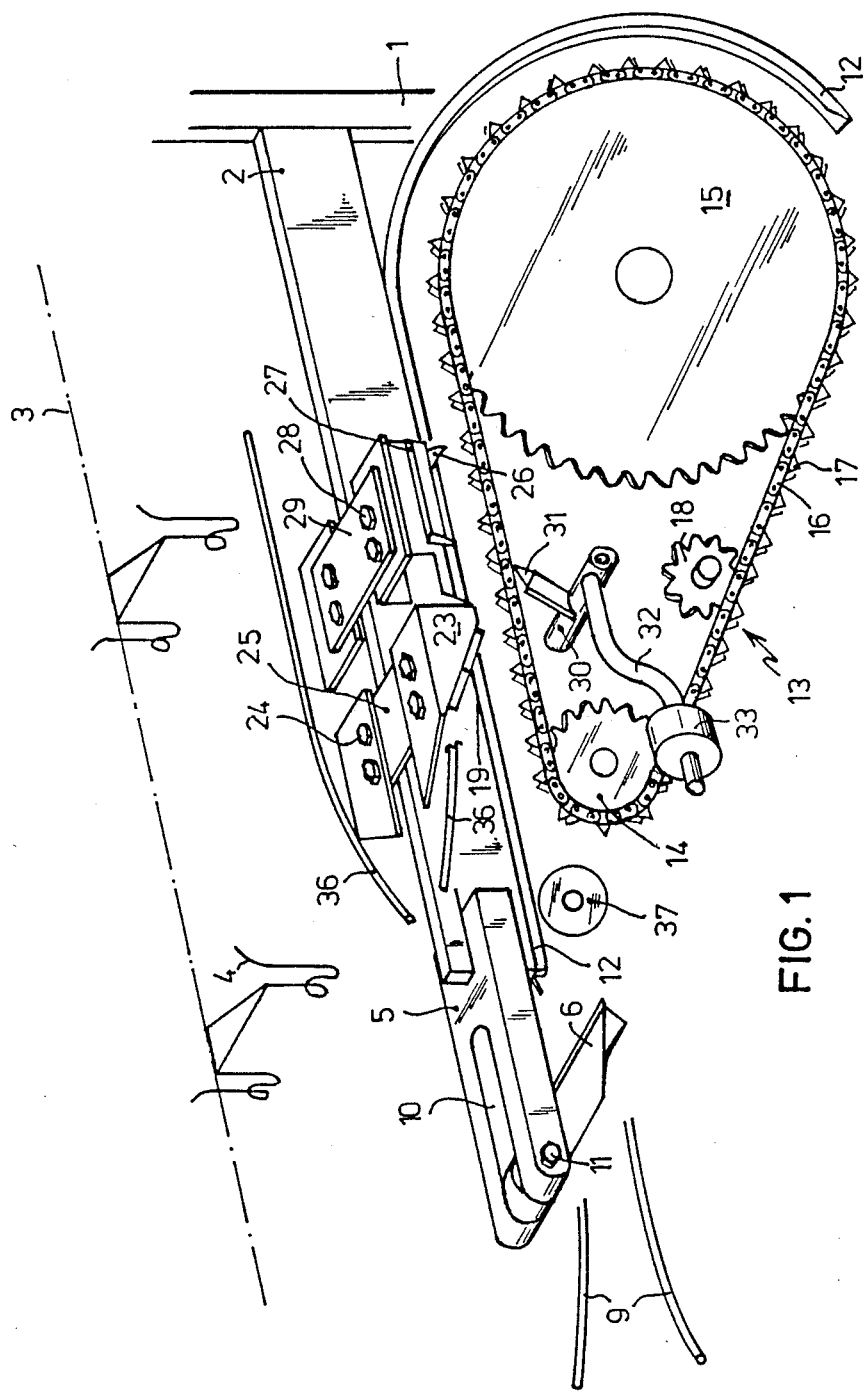
FIG. 1 is a perspective illustration of a part of an apparatus according to the present invention in a preferred form.
Figure 2:
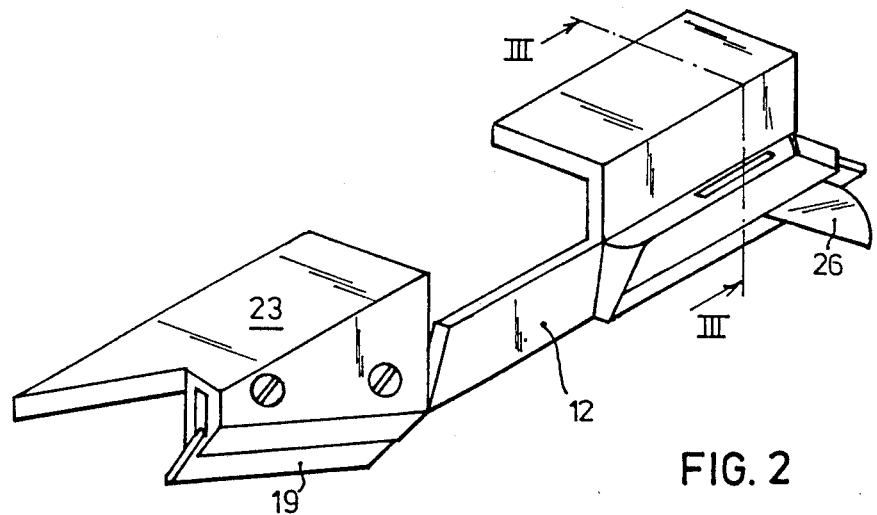
FIG. 2 is a perspective illustration of the apparatus of FIG. 1, showing first and second blades with pertaining supports on one side of the apparatus.
Figure 3:
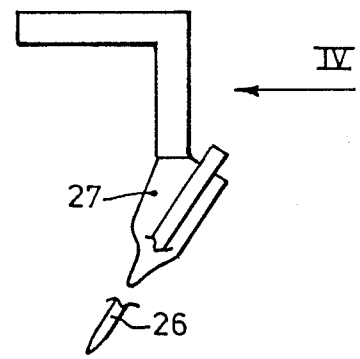
FIG. 3 shows a section along the line III—III of FIG. 2.
Figure 4:
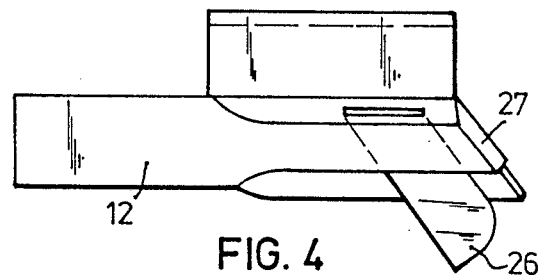
FIG. 4 shows a view in the direction of the arrow IV of FIG. 3.

The apparatus shown in FIG. 1 has a frame of which only one of the columns 1 has been shown. A horizontal blade-carrying plate 2 is connected to this column 1, which plate is parallel to an overhead conveyor 3 with hooks 4.

At the end of the blade-carrying plate 2 facing away from the column 1 a fork 5 is disposed to which is pivotably mounted an enlarging, suspended centering guide or valve 6 at its upstream end.

The hooks 4 are continuously moved from the left to the right in FIG. 1 by the conveyor 3. A pair of chicken legs 7, suspended from a hook 4 and interconnected by a back portion 8 (see FIG. 8), first externally contacts a pair of generally converging guide rails 9 and subsequently internally contacts the suspended centering guide 6 that pivots in a recess 10 of the fork 5 about a shaft mounted with screws 11.

Figure 5:
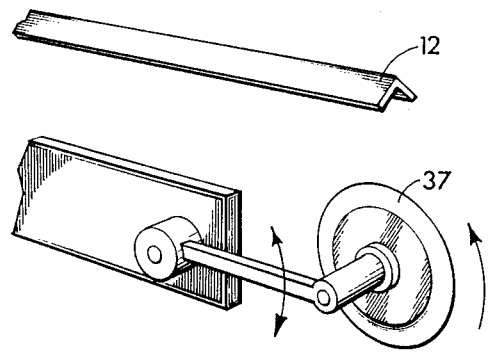
FIG. 5 is a schematic illustration of a portion of the apparatus of FIG. 1, showing in particular a swiveling disc cutter.

As illustrated in FIGS. 1 and 5, the end of the centering guide has such a triangular shape that it lies in the extension of the guide plate 12 disposed under the bearing plate 2 in the position moved upwards by the poultry carcass. Thus, the centering guide ensures that the back portion 8 internally properly engages the guide plate 12.

The poultry portion to be processed is now properly centered and subsequently enters the actual processing station 13.

The processing station 13 has advancement means including a chain 16 that extends over a small chain wheel 14 and a large chain wheel 15 in a vertical plane, which chain has outwardly projecting pins 17. As the tension chain wheel 18 will not be able to prevent the top part of the chain 16 from sagging, it is recommended to support this chain there (in a manner not shown). The pins 17 centrally engage the outer side of the back portion 8 and convey this at a speed higher than the speed of the conveyors 3, so that the joints are tensioned.

The processing station 13 furthermore comprises the before-mentioned guide plate 12 that also extends around the large chain wheel 15 in circle sector shape and thus ensures that the back portion 8 remains in the closed loop of the gripper member 16 when it is torn loose from the legs 7, after which the back portion is released at the bottom of the processing station.

Figure 8:
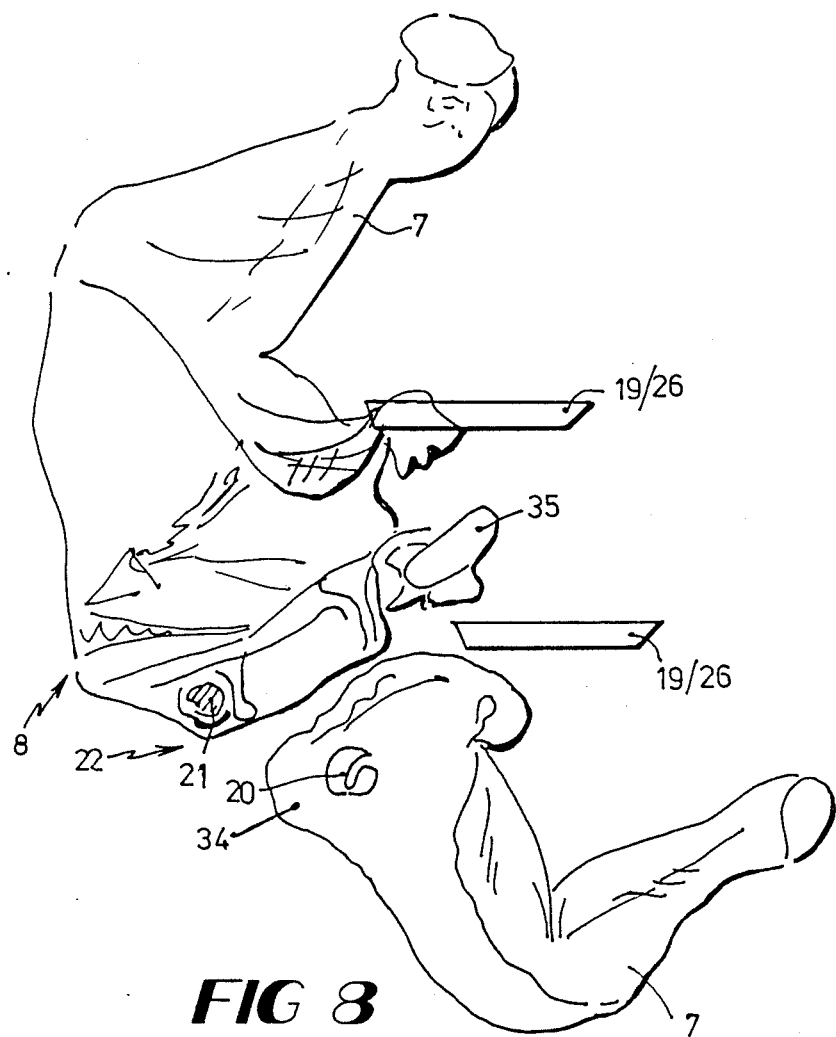
FIG. 8 shows, on a larger scale and in perspective, a back portion and two legs of the poultry, in which one of the legs, contrary to reality, has been shown as if loose.

A first pair of fixed blades 19 comprise thin, relatively weak blades that cut up to the thigh bone as schematically shown in FIG. 8, so that the joints, comprising a ball 20 and a cup 21, can be unfolded. These first blades 19 are disposed in corner pieces 23 that have been arranged adjustably over the width with bolts 24 on a first transverse part 25 that is connected to the blade-carrying plate 2.

A second pair of fixed blades 26 comprise relatively strong, pointed blades that cut the muscles around the exposed joints 22 visible in FIG. 8. These second blades 26 have been disposed adjustably and exchangeably in blade retainers 27 that have been mounted with bolts 28 on a second transverse part 29 that is connected to the blade-carrying plate 2.

A pair of lower blades 31 is pivotably disposed about a horizontal shaft 30 that score the poultry to determine the external tear lines between the back portion 8 and the legs 7. A rod 32 bent in an S-shape is welded to each of the shafts 30, onto which rod weight can be slid and fixed so as to determine the cutting force. Of course it is also possible to replace the weights 33 with springs.

Figure 6:
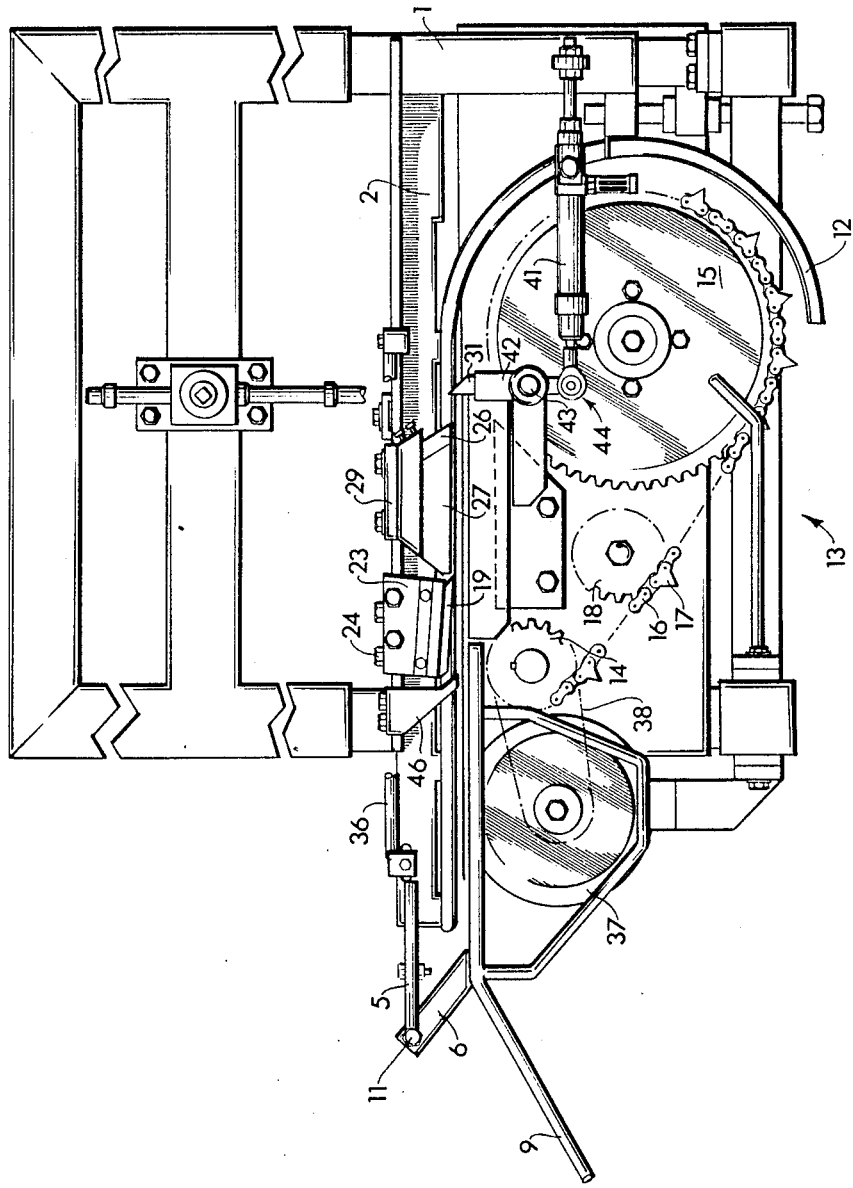
FIG. 6 is a side elevational view of an apparatus according to the present invention in a second preferred form.
Figure 7:
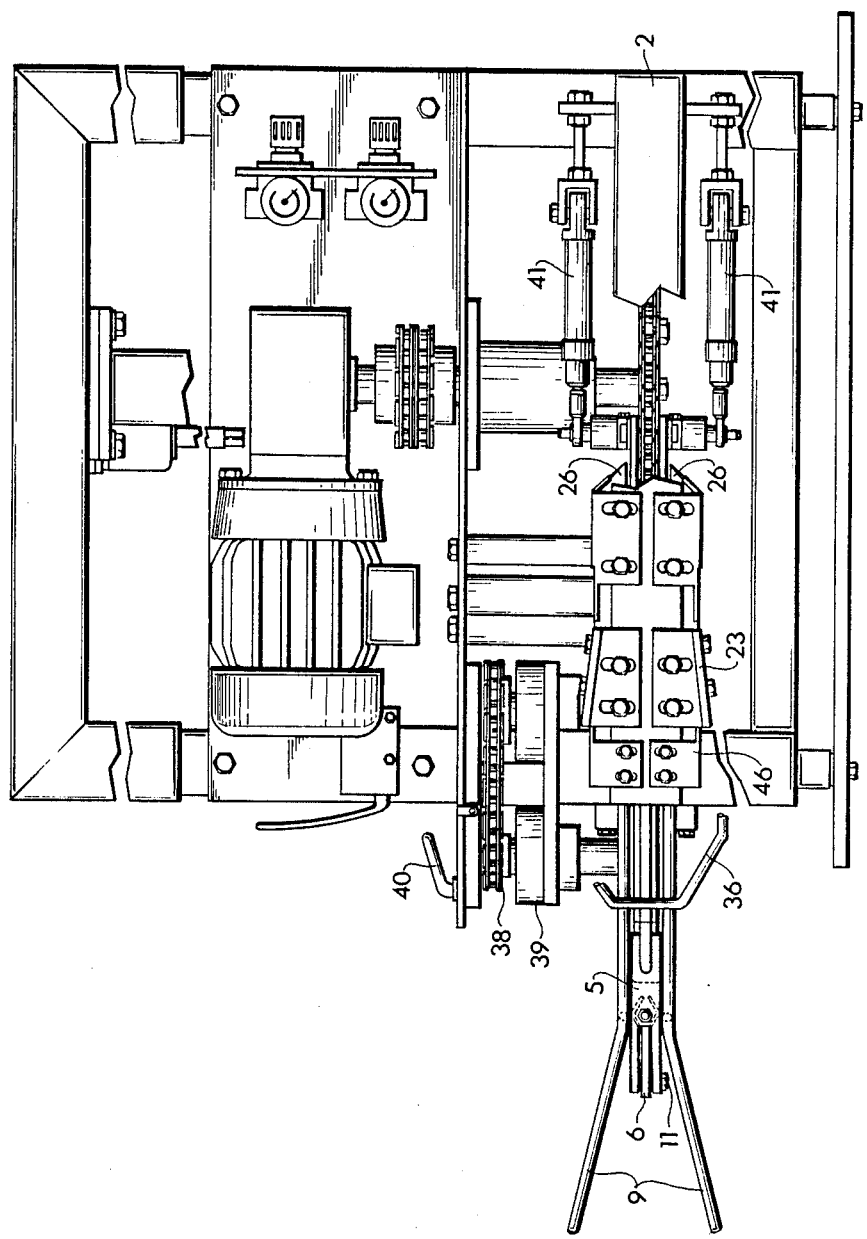
FIG. 7 is a plan view of the apparatus of FIG. 6.

FIGS. 6 and 7 show the invention in another preferred form in which the weights 33 are replaced with pneumatic cylinders 41. A pair of blade carrying members 42 are pivotably mounted about pivot pins 43. One end of each member 42 carries a lower blade 31 with the other end pivotably coupled to the pneumatic cylinder 41 by means of a ball and socket arrangement 44. So constructed, air pressure may be supplied to the cylinders to bias the lower blades with a selected force.

When the cylinders 41 are charged with air, the rod of each cylinder is retracted so as to pivot the blades 31 toward the direction of the oncoming birds. When a bird engages the cutting blades 31, these blades tend to cut the exterior skin and meat at the joints between the back and the thighs of the birds, tending to separate the backs from the thighs. The air charged cylinders 41 permit the blades 31 to pivot in the direction of movement of the birds so that the blades will not tend to cut through the bone at the joints of the birds, but will pivot so as to cause a slicing action with respect to the meat of the bird and cut around the joints.

FIGS. 5-7 show a rotary disc cutter 37 which is movably mounted for movement between a raised position and a lowered position. The disc cutter 37 is powered by the small chain wheel 14 via chain 38. The disc cutter is mounted to a housing 39 which is pivotably mounted at one end about an axis extending through the small chain wheel 14. The other end of the housing is releasably secured to the framework by means of a bolt 40 having a quick-release handle.

As shown in FIG. 6, a pair of guide protrusions 46 are mounted to the blade carrying plate 2 and extend downwardly on either side of the blade carrying plate. As a poultry back portion passes the guide protrusions 46, the protrusions tend to seek the joint between the back and thighs of the poultry to guide the joints toward the first cutter blades 19.

OPERATION

If all the blades 19, 26 and 31 have been correctly adjusted and if the speed ratio between the conveyor 3 and the chain 16 is also correct, the back portion 8, which was originally directed downwardly, is accelerated relative to the legs and rotates relative to the legs. The back portion thereby begins to tear loose from the legs 7 precisely at the location of the large chain wheel 15. The back portion is thus more or less torn off by the chain 16 and the guide plate 12, after incisions have been made in skin and tissue and muscles have been severed in the correct places.

Due to this optimum processing action, the so-called oysters 34 remain attached to the legs completely.

What remains is only the back portion 8 that is unattractive for direct consumption as it mainly consists of bone and fat. Furthermore, the peritoneum 35 now remains attached to the back portion 8.

In order to attain the above result, spreading guide rails 36, extending above the fixed blade pairs 19 and 26, may be employed as well to spread the legs apart somewhat.

In some cases it is desirable that the back portion 8 be halved, i.e., cut in the longitudinal direction without removing the legs from the back portion. In order to accomplish this without having to use a different apparatus, the invented apparatus may employ the movably mounted circular blade or disc cutter 37 disposed between the centering guide 6 and the chain 16, as seen in FIGS. 5-7. When the circular blade 37 is in the elevated position, the above-described special working of the apparatus to remove the legs is ruled out.

An apparatus according to the present invention has the advantage of being capable of being added to an existing conveyor line, without the necessity of rehanging the poultry on a separate conveyor.

While the apparatus has been disclosed in a preferred form, it will be obvious to one skilled in the art that numerous modifications, additions and deletions may be made therein, without departing from the spirit and scope of the invention.

What is claimed is:

1. An apparatus for removing the legs and thighs from the back portion of poultry of which the breast portion has already been removed, comprising a suspension conveying system with a series of spaced shackles interspaced at regular intervals from which the poultry carcasses to be processed can be suspended upside down by their legs, and a processing station mounted at a level below the conveyor and comprising blades for separating the thighs from the back of the carcass, characterized in that the processing station (13) comprises a gripper member for gripping the back portion (8) of a poultry carcass and carrying the back portion along a path diverging from the path of the legs as the legs are carried by the overhead conveying system at a higher speed than that of the suspension conveyor (3), and a guide plate (12) adjacent the gripper member for maintaining the back portion (8) in the diverging path so that the back becomes removed from the thighs.

2. An apparatus according to claim 1, characterized in that the gripper member is a chain conveyor (16) with outwardly projecting pins (17) for engaging and controlling the movement of the backs of the carcasses.

3. An apparatus according to claim 1, characterized in that the processing station (13) comprises means (12) for centering the poultry and guiding it along the blades (19, 26, 31).

4. An apparatus according to claim 3, characterized in that the centering means comprises a fork (5) that is cantilevered on a blade-carrying plate (2) and an enlarging, suspended centering guide (6) pivotably mounted to said fork at one end of the centering guide.

5. An apparatus according to claim 3, characterized in that the means for centering and guiding the poultry comprise guide rails (9, 36).

6. An apparatus according to claim 4, characterized in that a blade-carrying plate (2) bears two pairs of fixed blades (19, 26) that operate between the back portion (7) and the legs (9) of each poultry carcass moved the processing station, and one pair of pivotably disposed lower blades (31) that determine the external tear lines between the back portion (8) and the legs (7), the distance between two blades (19, 26) on either side of the blade-carrying plate (2) being bridged by a portion of the guide plate (12).

7. An apparatus according to claim 6, characterized in that the first pair of fixed blades (19) are adapted to cut near to, but not through, the thigh bone to expose the joints, after which the guide plate (12) seeks the joints (22).

8. An apparatus according to claim 6, characterized in that the second pair of fixed blades (26) comprises blades that are adapted to cut the exposed muscles of and around the joints (22) loose from the back portion (8).

9. An apparatus according to claim 1, characterized in that the pivotably disposed lower blades (31) are biased in a first direction by means of weights (33).

10. An apparatus according to claim 1, characterized in that a swiveling circle blade (37) is provided between the centering guide (6) and the chain (16) for movement between a first position in the path of the poultry for halving the poultry and a second position out of the path of the poultry.

11. An apparatus for removing backs from the thighs of previously eviscerated poultry carcasses of which the breasts have already been removed as the birds are moved along a processing path with the birds suspended invertedly by their legs from an overhead conveyor adapted to move the carcasses along the processing path, said apparatus comprising:

gripper means for gripping a back portion of the carcass;

means for moving said gripper means and the back portion of the carcass along a second path and away from the legs of the carcass as the legs are moved along the processing path by the overhead conveyor;

cutting blades positioned for cutting between the thighs and the back portion of each carcass as the back portion is moved along a first portion of said second path; and a guide member for retaining the back portion of the bird adjacent said gripper means as the back portion moves along said second path and away from the legs;

whereby at least part of the separation of the back portion from the thighs is accomplished by tearing as a result of the back portion being moved away from the legs.

12. The apparatus as claimed in claim 11 wherein a portion of said second path diverges from the processing path.

13. The apparatus as claimed in claim 11 wherein said first portion of said second path is generally parallel to the processing path.

14. The apparatus as claimed in claim 13 wherein the overhead conveyor comprises means for moving the legs of the carcass along the processing path at a first speed and said means for moving said gripper means and the back portion of the carcass includes means for moving said gripper means and the back portion of the carcass at a second speed different from the first speed.

15. The apparatus as claimed in claim 14 wherein said means for moving said gripper means and the back portion of the carcass comprises means for moving said gripper means and said back portion at a speed which is greater than said first speed.

16. The apparatus as claimed in claim 11 wherein said gripper means comprises a chain with outwardly projecting pins for engaging the back portion of the carcass.

17. The apparatus as claimed in claim 11 and further comprising means for centering the poultry in said apparatus and means for guiding the poultry to said cutting blades as the back portion moves along said second path.

18. The apparatus as claimed in claim 17 and wherein said centering means comprises a blade-carrying plate to which said cutting blades are mounted, a fork cantilevered from said blade-carrying plate, and an enlarging centering guide pivotally suspended from said fork.

19. The apparatus as claimed in claim 18 wherein said guiding means comprise first, generally converging guide rails for guiding poultry toward said blade-carrying plate, and second guide rails mounted to said blade-carrying plate for spreading the poultry legs.

20. The apparatus as claimed in claim 11 and wherein said cutting blades comprise first and second pairs of blades fixedly mounted and adapted to cut between the back portion and the legs, and a third pair of blades pivotably mounted and adapted to score the poultry between the legs and the back portion as the back portion is moved along said second path, whereby the location of the tear between the back portion and the legs can be controlled.

21. The apparatus as claimed in claim 20 wherein said first pair of fixed blades are adapted to cut the meat adjacent the thigh bone adjacent the back portion of the poultry to expose the joint between the thigh bone and the back portion, and wherein said guide member is elongated, generally V-shaped and comprises first and second surfaces adapted to seek the exposed joint between the thigh bone and the back portion.

22. The apparatus as claimed in claim 21 and wherein said second pair of fixed blades are adapted to cut the muscle of and adjacent the exposed joint between the thigh bone and the back portion from the back portion.

23. The apparatus as claimed in claim 20 wherein said third pair of blades is biased against rotation in one direction by means of a cantilevered weight.

24. The apparatus as claimed in claim 20 wherein said third pair of blades is biased against rotation in one direction by means of a pair of pneumatic cylinders.

25. The apparatus as claimed in claim 11 further comprising a rotating disc cutter adapted for halving the back portion of the poultry, said rotating disc cutter being movably mounted for movement between a first position in the path of the poultry to halve the poultry and a second position out of the path of the poultry to avoid engaging the poultry.

26. A method for processing poultry, as the birds are moved along a processing path with the birds suspended invertedly by their legs from an overhead conveyor adapted to move the poultry along the processing path, said method comprising the steps of:
rotating the thighs at the joints affixed to the back in a direction toward the proximal end of the back bone to tend to open the joint between the thighs and the back and to stretch the tissue at this part of the joint,
cutting with a first blade into the stretched tissue at the joint so as to permit the relative movement of the bones of the joint to open the joint,
cutting with a second blade between the bones of the joint through the tissue surrounding the joint to separate the bones of the joint, and
moving the back along a path that diverges from the path of the legs to pull the back from the thighs.

27. The method of claim 26 and wherein the step of rotating the thighs comprises advancing the legs with a suspended conveyor system at a first velocity and advancing the back along another conveyor system at a velocity greater than the first velocity.

28. The method of claim 27 and wherein the step of advancing the back along another conveyor system comprises advancing the back in a direction diverging from the direction of movement of the legs.

* * * * *